(12) United States Patent
Harutyunyan

(10) Patent No.: US 8,684,284 B2
(45) Date of Patent: Apr. 1, 2014

(54) INJECTOR FOR LARGE AMOUNT OF AEROSOL POWDER FOR SYNTHESIS OF CARBON NANOTUBES

(75) Inventor: Avetik R. Harutyunyan, Columbus, OH (US)

(73) Assignee: Honda Motor Co., Ltd., Tokyo (JP)

(*) Notice: Subject to any disclaimer, the term of this patent is extended or adjusted under 35 U.S.C. 154(b) by 1512 days.

(21) Appl. No.: 11/945,152

(22) Filed: Nov. 26, 2007

(65) Prior Publication Data
US 2012/0138148 A1    Jun. 7, 2012

Related U.S. Application Data

(60) Provisional application No. 60/867,145, filed on Nov. 24, 2006.

(51) Int. Cl.
*F02M 47/02* (2006.01)
*B05B 9/00* (2006.01)
*B05B 7/04* (2006.01)
*B05B 1/34* (2006.01)

(52) U.S. Cl.
CPC ............. *B05B 1/3436* (2013.01); *B05B 1/3426* (2013.01); *B05B 1/3421* (2013.01); *B05B 1/341* (2013.01); *B05B 1/3405* (2013.01)
USPC ............. 239/468; 239/88; 239/143; 239/434; 239/463; 239/472

(58) Field of Classification Search
CPC ........ B05B 1/34; B05B 1/3405; B05B 1/341; B05B 1/3421; B05B 1/3426; B05B 1/3436
USPC ............ 423/447.3; 442/139, 232; 239/88, 89, 239/135, 143, 399, 433, 434, 463, 468, 469, 239/472, 486
See application file for complete search history.

(56) References Cited

U.S. PATENT DOCUMENTS 3,558,052 A    1/1971   Dunn
3,746,254 A    7/1973   Duncan et al.
(Continued)

FOREIGN PATENT DOCUMENTS

EP    0 297 463 A1    1/1989
JP    62-111663 U    7/1987
(Continued)

OTHER PUBLICATIONS

Bohnet, M., "*Calculation and Design of Gas/Solid-Injectors*," Powder Technology, 1984, pp. 302-313, Hemisphere Publishing Corp.
(Continued)

*Primary Examiner* — Ryan Reis
(74) *Attorney, Agent, or Firm* — Fenwick & West LLP; Mark E. Duell

(57) ABSTRACT

Methods, processes, and apparatuses for the large scale synthesis of carbon nanostructures are provided. The apparatus for continuous large scale production of SWNTs includes a chamber. Positioned in one end of the chamber is a piston and at the other end is a tangential vortex created by gases forced into the chamber from opposite sides of the chamber walls. The chamber can be heated to reduce or eliminate agglomeration of small particles. The piston is used to push the catalyst towards the vortex, and the injection rate is controlled by the speed of the piston and the gas flow rate to create the vortex that also act as the transport gas. Thus, greater than 1 kg/h of an aerosolized, deagglomerated dry powder catalyst can be delivered to the reactor at a constant flow rate.

11 Claims, 1 Drawing Sheet

(56) References Cited

U.S. PATENT DOCUMENTS

| | | | |
|---|---|---|---|
| 3,776,150 | A | 12/1973 | Evans et al. |
| 4,116,367 | A | 9/1978 | Kataoka et al. |
| 4,561,808 | A | 12/1985 | Spaulding et al. |
| 4,863,316 | A | 9/1989 | Gianella et al. |
| 4,900,199 | A | 2/1990 | Spaulding et al. |
| 5,037,791 | A | 8/1991 | Comolli et al. |
| 5,056,720 | A | 10/1991 | Crum et al. |
| 5,145,293 | A | 9/1992 | Savino et al. |
| 5,279,854 | A | 1/1994 | Kendall et al. |
| 5,727,732 | A | 3/1998 | Stein |
| 5,756,207 | A | 5/1998 | Clough et al. |
| 6,413,487 | B1 | 7/2002 | Resasco et al. |
| 6,730,284 | B2 | 5/2004 | Harutyunyan et al. |
| 6,905,544 | B2 | 6/2005 | Setoguchi et al. |
| 6,919,064 | B2 | 7/2005 | Resasco et al. |
| 6,955,800 | B2 | 10/2005 | Resasco et al. |
| 7,131,597 | B2 * | 11/2006 | Scattergood ............... 239/8 |
| 7,704,466 | B2 * | 4/2010 | Wu ............... 422/232 |
| 8,268,281 | B2 | 9/2012 | Harutyunyan et al. |
| 2003/0143151 | A1 | 7/2003 | Diener et al. |
| 2004/0151654 | A1 | 8/2004 | Wei et al. |
| 2005/0074392 | A1 | 4/2005 | Yang et al. |
| 2005/0121545 | A1 | 6/2005 | Harutyunyan et al. |
| 2005/0123467 | A1 * | 6/2005 | Harutyunyan ............ 423/447.1 |
| 2006/0039849 | A1 | 2/2006 | Resasco et al. |
| 2006/0184118 | A1 * | 8/2006 | Hjertman ............... 604/141 |
| 2007/0116632 | A1 * | 5/2007 | Harutyunyan ............ 423/447.3 |
| 2007/0264187 | A1 * | 11/2007 | Harutyunyan et al. .... 423/447.3 |

FOREIGN PATENT DOCUMENTS

| | | | |
|---|---|---|---|
| JP | 2004-154739 | A | 6/2004 |
| JP | 2004-169119 | A | 6/2004 |
| JP | 2004 075453 | A | 11/2004 |
| JP | 2005-511468 | A | 4/2005 |

OTHER PUBLICATIONS

Cheng, Y.S., et al., "*A Venturi Disperser as a Dry Powder Generator of Inhalation Studies*," Inhalation Technology, 1989, pp. 365-371, vol. 1, No. 4.

Drew, R., et al., "*A New Dust-Generating System for Inhalation Studies*," American Industrial Hygiene Association Journal, Jan. 1971, pp. 327-330, vol. 32, No. 1.

Ebens, R., et al., "A device for the continuously metering of small dust quantities," Staub, Reinhaltung der Luft, May 1968.

Wright, B.M., et al., "*A New Dust-Feed Mechanism*," Journal of Scientific Instruments, 1950, pp. 12-15, vol. XXVII, The Institute of Physics, London, England.

PCT International Search Report and Written Opinion, PCT/US2007/085533, May 7, 2008.

Dai, H., et al., "Single-wall nanotubes produced by metal-catalyzed disproportionation of carbon monoxide," Chemical Physics Letters, vol. 260, pp. 471-475, Sep. 27, 1996.

Harutyunyan, A.R., et al., "A New Approach for Industrial-Scale Production of Carbon Single-Walled Nanotubes," Mater. Res. Soc. Symp. Proc., vol. 896, pp. 0896-H05-05.1-0896-H05-05.5, Feb. 24, 2006.

Sinclair, J.L., et al., "Gas-Particle Flow in a Vertical Pipe with Particle-Particle Interactions," AIChE Journal, vol. 35, No. 9, pp. 1473-1486, Sep. 1989.

Japanese Patent Office, Office Action, Japanese Patent Application No. 2009-538529, Mar. 12, 2013, six pages. (Please note that the English translation includes a typographical error and "Prior art document" JP S60-201791 should be JP S60-202791).

Japanese Patent Office, Office Action, Japanese Patent Application No. 2009-538529, Aug. 6, 2013, four pages.

\* cited by examiner

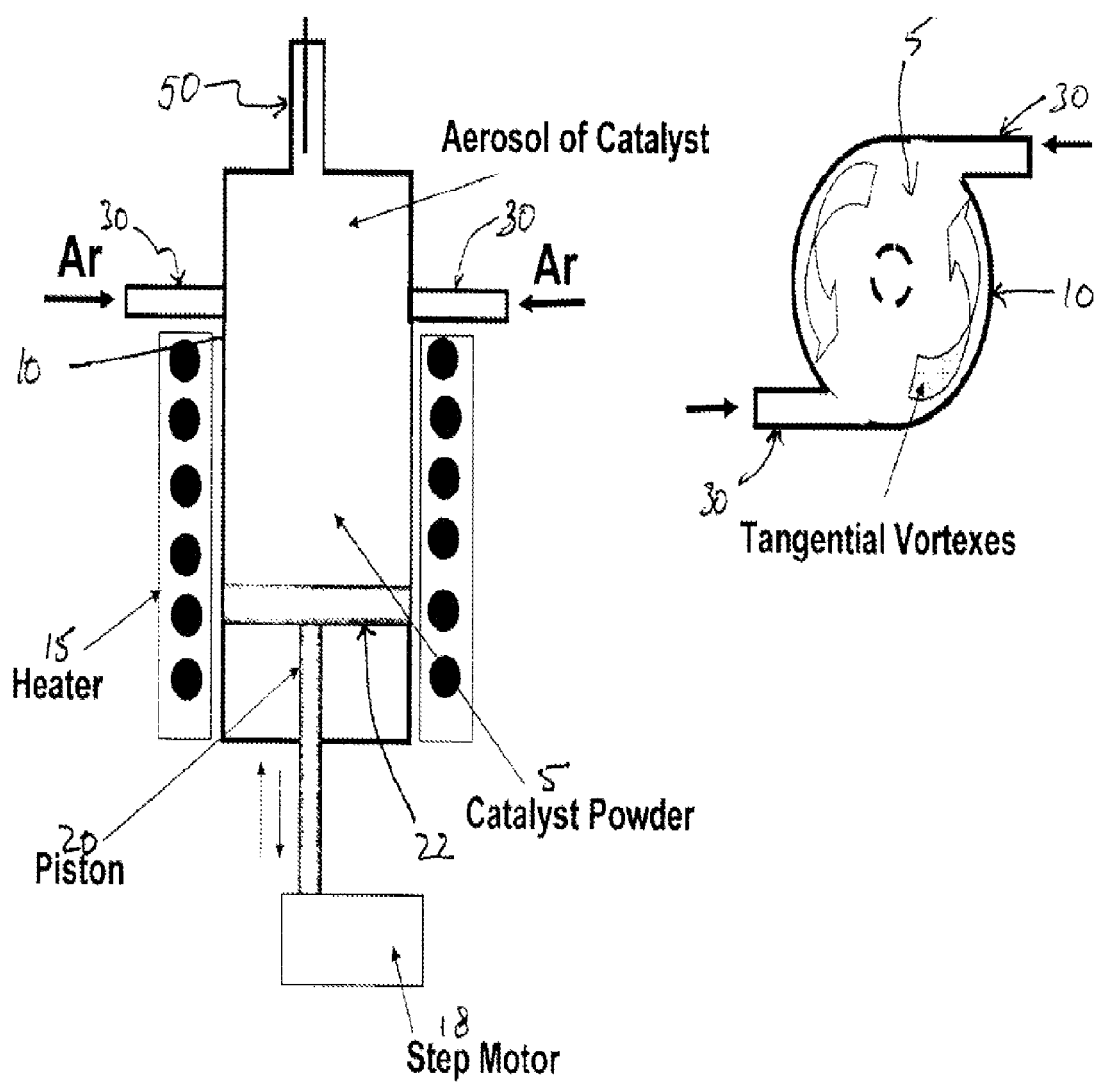

INJECTOR FOR LARGE AMOUNT OF AEROSOL POWDER FOR SYNTHESIS OF CARBON NANOTUBES

CROSS-REFERENCE TO RELATED APPLICATIONS

This application claims the benefit of U.S. Provisional Patent Application No. 60/867,145, filed on Nov. 24, 2006, and which is herein incorporated by reference in its entirety.

FIELD OF INVENTION

The present invention relates to producing carbon nanotubes, more particularly, to methods and apparatus for the large scale production of carbon single-walled nanotubes.

BACKGROUND

Aerosol generation systems are used in industry for injecting powders into tubes for pneumatic transport; in toxicology and industrial hygiene for generating study atmospheres; and in medicine for delivering particulate drugs to patients by the inhalation route. Several types of generators are commercially available, including: the Venturi tube powder injector, which utilizes pressurized air (Bohnet M., Calculation and design of gas/solid injectors. Powder Technology, 302-313, 1984; Cheng, Y., Barr et al., "A Venturi dispenser as a dry powder generator for inhalation studies," Inhalation Toxicology 1: 365-371, 1989), the Wright dust feeder, which uses a rotating scraper, (Wright, B., "A new dust-feed mechanism," Journal of Scientific Instruments, 27: 12-15, 1950) and various fluidized bed designs, which use blowing air (Drew, R. and Laskin, S., "A new dust-generating system for inhalation studies," American Industrial Hygiene Association Journal, 32: 327-330, 1971; Ebens R. and Vos, M. "A device for the continuous metering of small dust quantities," Staub-Reinhalt der Luft, 28(5): 24-25, 1971).

Typically, a jet pump or ejector is used to aspirate powder from a powder container or hopper and to transfer the powder through an outlet conduit to a spray device (U.S. Pat. No. 5,056,720). In order to meter or control the rate of flow of powder from the powder source, such pumps conventionally include a metering air flow that injects a controlled flow of air into the powder supply. The pressure of this metering air flow controls the amount of air which is mixed with the powder entering the pump. Consequently, if the metering air flow pressure is increased, the amount of air in the powder-air mixture is increased and therefore the net powder flow rate is decreased. Conversely, if the metering air flow pressure is decreased, the amount of air in the powder-air mixture is decreased and therefore the net flow rate of powder is increased. Another method is disclosed by JP 2004075453 to Hayashi Shinji which describes forming carbon nanotubes and/or fullerenes inside a cylinder having a piston and intake and outtake valves. The hydrocarbon gas is injected into the cylinder through a nozzle and the contents compressed rapidly to produce the carbon nanotubes.

One of the shortcomings of these powder delivery systems is that the powder ejected normally flows unevenly to the target. There are periodic puffs or clouds of powder delivered and periodic reductions in the density of powder delivered. Such periodic increases or decreases in powder density result in uneven application of powder to the target, which are not desirable. Thus the ability to control the flow rate of the powder is very important in order to deliver the powder smoothly without surging or pulsing effects; to control the velocity at which the powder is delivered; and to insure that the air entrained powder is well dispersed in the air stream before reaching the target, such as a reaction chamber for the production of carbon nanotubes. Thus, there is a need for methods for delivering powders in a controlled manner.

SUMMARY

The present invention provides methods, apparatuses, and processes for the large scale continuous production of carbon nanostructures, such as carbon single-walled nanotubes (SWNTs). In one aspect, the inventive apparatus is used as an injector for the supported catalyst used for the continuous large scale production of carbon SWNTs. The advantages of the injector are that it provides an injection of aerosolized, deagglomerated catalyst as a dry powder that can be delivered into a reactor at a constant rate of flow and a large amount can be delivered.

In one aspect, the invention provides an apparatus for injecting dry powder. The dry powder can be metal particles having controlled particle size and/or diameter, and can be supported on non-carbon containing powdered oxide supports and placed in a container. The container can have side walls, an upper end, and a lower end; a bar attached to a piston can be present at the lower end of the container; a nozzle can be present at the upper end of the container; and a plurality of gas inlets can be present in the sidewalls placed in between the nozzle and the bar, wherein the dry powder can be placed over the bar and below the gas inlets. The dry powder is preferably a catalyst for preparing SWNTs. The dry powder or catalyst can be a metal catalyst supported on a powdered oxide substrate wherein the powdered oxide substrate has a particle size of 0.5 µm to 5 µm, and the aerosol is created using pressurized helium or argon. In some aspects, the aerosolized powder can be heated to about 600° C. to about 1200° C.

In another aspect of the invention, the invention provides methods for producing carbon single-walled carbon nanotubes (SWNTs). The methods comprise injecting an aerosol of heated, dry, and reduced catalytic particles into a reactor wherein the catalytic particles comprise a support-material and a catalytic material, and wherein the aerosol can be created using the injector of the invention. The methods comprise placing powder in an injector, wherein the injector comprises a container having sidewalls, an upper end, and a lower end wherein the lower end comprises a bar attached to a piston, the upper end comprises a nozzle, and the sidewalls comprising a plurality of gas inlets placed in between the nozzle and the bar, wherein the dry powder is placed over the bar and below the gas inlets; pushing the powder towards the upper end using the piston; and creating a vortex near the upper end by flowing a gas through the gas inlets wherein the powder is entailed in the vortex and the entailed powder is injected through the nozzle. The catalytic particles can be cobalt, iron, nickel, tungsten, molybdenum or combinations thereof, the support material can be $SiO_2$, $Al_2O_3$, MgO, $ZrO_2$, zeolites, MCM-41, or Mg(Al)O, or combinations thereof. The supported catalyst can have a particle size of 0.5 µm to 5 µm, and the aerosol is created using pressurized helium or argon. In some aspects, the aerosolized catalyst can be heated to about 600° C. to about 1200° C. The piston and the gas flow can be adjusted to deliver 1 kg/h or greater of an aerosolized, deagglomerated dry powder catalyst to the reactor. Thus, the piston and the gas flow can be adjusted to inject the powder at a rate of about 1 g/h to about 5 kg/h into the reactor, preferably about 500 g/h to about 4.5 kg/h, or more preferably, about 600 g/h to about 4 kg/h.

These and other aspects of the present invention will become evident upon reference to the following detailed description. In addition, various references are set forth herein which describe in more detail certain procedures or compositions, and are therefore incorporated by reference in their entirety.

BRIEF DESCRIPTION OF DRAWINGS

FIG. 1 illustrates an injector of the present invention.

DETAILED DESCRIPTION

I. Definitions

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise. Definition of standard chemistry terms may be found in reference works, including Carey and Sundberg (1992) "Advanced Organic Chemistry 3rd Ed." Vols. A and B, Plenum Press, New York, and Cotton et al. (1999) "Advanced Inorganic Chemistry 6th Ed." Wiley, New York.

The terms "metalorganic" or "organometallic" are used interchangeably and refer to co-ordination compounds of organic compounds and a metal, a transition metal or metal halide.

The term "passivating solvent" as used herein refers to an organic solvent that will not co-ordinate with the metal ions, and that is suitable for use in thermal decomposition reactions.

The term "halogen" as used herein refers to fluoro, bromo, chloro and/or iodo.

The term "lower alkoxy" refers to the oxides of lower alkyl groups. Examples of lower alkyl groups include, but are not limited to, methyl, ethyl, propyl, isopropyl, butyl, isobutyl, sec-butyl, tert-butyl, pentyl, n-hexyl, octyl, dodecyl, and the like. The oxides includes methoxide, ethoxide, butoxide, and the like.

The present invention discloses methods, apparatus, and processes for the delivery of aerosolized powders, such as catalysts supported on solids.

An injector of the invention is illustrated in FIG. 1. The catalyst powder, placed in the container, can be displaced towards the opening that connects the injector with the reactor and allows for the transport of the catalyst into the reactor. Near the opening, inert gas or gases can be used to create tangential vortexes that fluidize or entrain the catalyst. By varying the chamber volume, the rate of displacement of the catalyst, and the gas flow rate, large amounts of aerosol powder can be injected into the reactor. Thus, for example, the supported catalyst can be introduced at the top of a vertical reaction chamber and allowed to move downward through the reactant gas, and the solid material withdrawn from the bottom of the reaction chamber. The solid material containing the product(s), unreacted catalyst, and byproducts can be separated by methods such as by filter, centrifuge or cyclone separator, and the recovered unreacted catalyst can be recycled.

The present method is especially designed for the production of carbon single-walled nanotubes (SWNTs) because the reaction conditions to which the catalytic particles are exposed are highly controlled. The ability to regulate temperature and reactant concentrations is important to obtain the high selectivity necessary to produce SWNTs. Further, the methods and apparatuses of the present invention allow for the continuous synthesis of SWNTs. In the methods and apparatuses described herein, the process of preparing and delivering the catalyst has been separated from the reactor in which the synthesis of SWNTs such that the catalytic particles are not contacted with the reactive gas (e.g., methane or carbon monoxide) until the optimal reaction conditions have been achieved. For example, the yield of nanotubes can be affected by the catalyst formulation (e.g., transition metal ratio, type of support, and metal loading), by the operating parameters (e.g., reaction temperature, catalytic gas pressure, and reaction time), and by pretreatment conditions.

The injector of FIG. 1 comprises a container 10 for the supported catalytic particles 5, heaters 15 for heating the gases and/or the supported catalyst, and a piston 20 positioned in the chamber 10 where the piston is connected to a step motor via a crankshaft. The supported catalyst within the chamber 10 can be heated to an appropriate reaction temperature using the heaters 15, the electrostatic charge, if present, can be neutralized and the aerosolized catalyst can be delivered via the nozzle 50 to the reactor at a constant flow rate. Thus, the injector of the invention has the advantage of providing a homogeneous and constant concentration of the catalyst particles for the synthesis of the SWNTs. The methods and apparatus of the invention provide high yields of SWNTs, thereby allowing for the industrial production of SWNTs.

Initially, a quantity of catalytic particles 5 can be introduced into a container, such as but not limited to, the container 10 illustrated in FIG. 1. The container 10 can be any suitable vessel for holding the catalytic particles, and can be made or pyrex, glass, non reactive metal, such as steel, and the like. In one aspect, the container 10 comprises a conventional container, such as a cylinder, having side walls and two ends. At one end of the container, a pneumatic-powered assembly is provided that comprises a step motor 18, a piston 20 connected to the step motor 18 via a crankshaft, and a bar 22 closely fitted in the cylinder of the container 10 and having one end fixedly connected to the piston 20. Upon activation, the step motor pushes the bar upwards through the container or brings it down, as determined by the operator. The other end of the container comprises a nozzle 50 that is attached to the reactor. The catalytic particles exit the container through the nozzle and into the reactor.

Near the nozzle 50 end of the container are gas inlets 30 situated in the container side walls. The container can have 1, 2, 3, 4, 5, 6, or more gas inlets. The gas inlets are situated such that a tangential vortex can be created within the container 10. The gas inlets can be, for example, about 10 inches from the nozzle, or about 5 inches from the nozzle, or about 0.1 to about 3 inches from the nozzle. Thus, in one aspect of the invention, two gas inlets are situated opposite each other. Inert gas is made to flow into the container through each of the gas inlets and at a rate of about 0.1 Lpm to about 200 Lpm. The gas can be an inert gas, such as Ar, He, Kr, Xe, or $N_2$ and combinations thereof, and can be introduced under increased pressure. The gas entering the container through the gas inlets create a vortex in the container 10 above the bar 22 and the catalyst powder 5. The vortex entrails the catalyst powder thereby creating an aerosol of the catalyst where the catalyst particles float or hover in the air flow, thereby providing the fluidized powder. The fluidized powder can exit through the nozzle 50 and into the reactor.

Typically, the catalytic particles 5 can be heated using the heaters 15, or by any other means known in the art, to a range of from about 400° C. to about 800° C., preferably about 450° C. to about 550° C., such as for example 500° C., or from about 600° C. to about 1200° C., preferably to about 750° C.

to about 950° C. The heating can be in the presence of air, under reduced pressure, or in the presence of reducing gases, such as $H_2$, $NH_3$, $CH_4$, or mixtures thereof and/or other gases such as He, Ar, Kr, Xe, and $N_2$.

The heated catalytic powder can be pushed upwards using the piston. At the same time, pressurized gas, such as Ar, is forced into the container through the gas inlets 30 to aerosolize the catalytic powder. The gas flow can be adjusted to deliver greater than about 1 kg/h of an aerosolized, deagglomerated dry powder catalyst to the reactor. Thus, the piston and the gas flow can be adjusted to inject the powder at a rate of about 1 g/h to about 5 kg/h into the reactor, preferably about 500 g/h to about 4.5 kg/h, or more preferably, about 600 g/h to about 4 kg/h. The concentration of the aerosolized particles entrained in the gas can be adjusted to meet the requirements of the experiment. The electrostatic charge on the aerosolized catalyst powder, if present, can be neutralized using any commercially available neutralizer. The heated and/or deionized aerosolized catalyst powder can be delivered to the reactor via the nozzle 50. The flow of the aerosolized catalyst powder that is delivered to the reactor can be controlled by adjusting the flow rate of the gas used to aerosolize the supported catalyst, and the rate at which the piston pushes the catalyst powder towards the vortex. For example, a concentration of about 1 $g/m^3$ to about 150 $g/m^3$, preferably about 5 $g/m^3$ to 100 $g/m^3$, or a concentration about 200 $g/m^3$ can be delivered as required. Thus, the injector of the invention has the advantage of providing a homogeneous and constant concentration of the catalyst particles for the large scale continuous synthesis of the SWNTs.

III. The Catalyst

The method, processes, and apparatuses of the present invention use supported metal nanoparticles as the catalyst powder. The metal or combination of metals selected as the catalyst can be processed to obtain the desired particle size and diameter distribution. The metal nanoparticles can then be separated by being supported on a material suitable for use as a support during synthesis of carbon nanotubes using the metal growth catalysts described below. Such materials include powders of crystalline silicon, polysilicon, silicon nitride, tungsten, magnesium, aluminum and their oxides, preferably aluminum oxide, silicon oxide, magnesium oxide, or titanium dioxide, or combination thereof, optionally modified by addition elements, are used as support powders. The metal nanoparticles on the support powders are injected as an aerosol into the reaction vessel. The function of the metallic catalyst in the carbon nanotube growth process is to decompose the carbon precursors and aid the deposition of ordered carbon as nanotubes The metal catalyst can be selected from a Group V metal, such as V, Nb, or Ta and mixtures thereof, a Group VI metal including Cr, W, Mo, or U and mixtures thereof, VII metal, such as, Mn, or Re, Group VIII metal including Co, Ni, Ru, Rh, Pd, Os, Ir, Pt, and mixtures thereof, or the lanthanides, such as Ce, Eu, Er, or Yb and mixtures thereof, or transition metals such as Cu, Ag, Au, Zn, Cd, Hg, Sc, Y, or La and mixtures thereof. Specific examples of mixture of catalysts, such as bimetallic catalysts, which may be employed by the present invention include Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Ir—W, Ir—Mo, Pt—Cr, Pt—W, and Pt—Mo. Preferably, the metal catalyst is iron, cobalt, nickel, molybdenum, or a mixture thereof, such as Fe—Mo, Co—Mo and Ni—Fe—Mo.

The metal, bimetal, or combination of metals are used to prepare metal nanoparticles having defined particle size and diameter distribution. The metal nanoparticles can be prepared by thermal decomposition of the corresponding metal salt added to a passivating salt, and the temperature of the solvent adjusted to provide the metal nanoparticles, as described in the co-pending and co-owned U.S. patent application Ser. No. 10/304,316, or by any other method known in the art. The particle size and diameter of the metal nanoparticles can be controlled by using the appropriate concentration of metal in the passivating solvent and by controlling the length of time the reaction is allowed to proceed at the thermal decomposition temperature. Metal nanoparticles having particle size of about 0.1 nm to about 100 nm, preferably about 1 nm to about 20 nm, more preferably about 2 nm to about 11 nm and most preferably about 3 nm to 7 nm can be prepared. The metal nanoparticles can thus have a particle size of 2, 3, 4, 5, 6, 7, 8, 9, or 10 nm, and up to about 20 nm. In another aspect, the metal nanoparticles can have a range of particle sizes. For example, the metal nanoparticles can have particle sizes in the range of about 3 nm and about 7 nm in size, about 5 nm and about 10 nm in size, or about 8 nm and about 16 nm in size. The metal nanoparticles can optionally have a diameter distribution of about 0.5 nm to about 20 nm, preferably about 1 nm to about 15 nm, more preferably about 1 nm to about 5 nm. Thus, the metal nanoparticles can have a diameter distribution of about 1, 2, 3, 4, 5, 6, 7, 8, 9, 10, 11, 12, 13, 14, or 15 nm.

The metal salt can be any salt of the metal, and can be selected such that the melting point of the metal salt is lower than the boiling point of the passivating solvent. Thus, the metal salt contains the metal ion and a counter ion, where the counter ion can be nitrate, nitride, perchlorate, sulfate, sulfide, acetate, halide, oxide, such as methoxide or ethoxide, acetylacetonate, and the like. For example, the metal salt can be iron acetate ($FeAc_2$), nickel acetate ($NiAc_2$), palladium acetate ($PdAc_2$), molybdenum acetate ($MoAc_3$), and the like, and combinations thereof. The melting point of the metal salt is preferably about 5° C. to 50° C. lower than the boiling point, more preferably about 5° C. to about 20° C. lower than the boiling point of the passivating solvent.

The metal salt can be dissolved in a passivating solvent to give a solution, a suspension, or a dispersion. The solvent is preferably an organic solvent, and can be one in which the chosen metal salt is relatively soluble and stable, and where the solvent has a high enough vapor pressure that it can be easily evaporated under experimental conditions. The solvent can be an ether, such as a glycol ether, 2-(2-butoxyethoxy) ethanol, $H(OCH_2CH_2)_2O(CH_2)_3CH_3$, which will be referred to below using the common name dietheylene glycol mono-n-butyl ether, and the like.

The relative amounts of metal salt and passivating solvent are factors in controlling the size of nanoparticles produced. A wide range of molar ratios, here referring to total moles of metal salt per mole of passivating solvent, can be used for forming the metal nanoparticles. Typical molar ratios of metal salt to passivating solvent include ratios as low as about 0.0222 (1:45), or as high as about 2.0 (2:1), or any ratio in between. Thus, for example, about $5.75 \times 10^{-5}$ to about $1.73 \times 10^{-3}$ moles (10-300 mg) of $FeAc_2$ can be dissolved in about $3 \times 10^{-4}$ to about $3 \times 10^{-3}$ moles (50-500 ml) of diethylene glycol mono-n-butyl ether.

In another aspect, more than one metal salt can be added to the reaction vessel in order to form metal nanoparticles composed of two or more metals, where the counter ion can be the same or can be different. The relative amounts of each metal salt used can be a factor in controlling the composition of the resulting metal nanoparticles. For the bimetals, the molar ratio of the first metal salt to the second metal salt can be about 1:10 to about 10:1, preferably about 2:1 to about 1:2, or more preferably about 1.5:1 to about 1:1.5, or any ratio in between. Thus, for example, the molar ratio of iron acetate to nickel acetate can be 1:2, 1:1.5, 1.5:1, or 1:1. Those skilled in the art will recognize that other combinations of metal salts and other molar ratios of a first metal salt relative to a second metal salt may be used in order to synthesize metal nanoparticles with various compositions.

The passivating solvent and the metal salt reaction solution can be mixed to give a homogeneous solution, suspension, or dispersion. The reaction solution can be mixed using standard laboratory stirrers, mixtures, sonicators, and the like, optionally with heating. The homogenous mixture thus obtained can be subjected to thermal decomposition in order to form the metal nanoparticles.

The thermal decomposition reaction is started by heating the contents of the reaction vessel to a temperature above the melting point of at least one metal salt in the reaction vessel. Any suitable heat source may be used including standard laboratory heaters, such as a heating mantle, a hot plate, or a Bunsen burner, and the heating can be under reflux. The length of the thermal decomposition can be selected such that the desired size of the metal nanoparticles can be obtained. Typical reaction times can be from about 10 minutes to about 120 minutes, or any integer in between. The thermal decomposition reaction is stopped at the desired time by reducing the temperature of the contents of the reaction vessel to a temperature below the melting point of the metal salt.

The size and distribution of metal nanoparticles produced can be verified by any suitable method. One method of verification is transmission electron microscopy (TEM). A suitable model is the Phillips CM300 FEG TEM that is commercially available from FEI Company of Hillsboro, Oreg. In order to take TEM micrographs of the metal nanoparticles, 1 or more drops of the metal nanoparticle/passivating solvent solution are placed on a carbon membrane grid or other grid suitable for obtaining TEM micrographs. The TEM apparatus is then used to obtain micrographs of the nanoparticles that can be used to determine the distribution of nanoparticle sizes created.

The metal nanoparticles, such as those formed by thermal decomposition described in detail above, can then be supported on solid supports. The solid support can be silica, alumina, MCM-41, MgO, ZrO$_2$, aluminum-stabilized magnesium oxide, zeolites, or other oxidic supports known in the art, and combinations thereof. For example, Al$_2$O$_3$—SiO$_2$ hybrid support could be used. Preferably, the support is aluminum oxide (Al$_2$O$_3$) or silica (SiO$_2$). The oxide used as solid support can be powdered thereby providing small particle sizes and large surface areas. The powdered oxide can preferably have a particle size between about 0.01 μm to about 100 μm, more preferably about 0.1 μm to about 10 μm, even more preferably about 0.5 μm to about 5 μm, and most preferably about 1 μm to about 2 μm. The powdered oxide can have a surface area of about 50 to about 1000 m$^2$/g, more preferably a surface area of about 200 to about 800 m$^2$/g. The powdered oxide can be freshly prepared or commercially available.

In one aspect, the metal nanoparticles are supported on solid supports via secondary dispersion and extraction. Secondary dispersion begins by introducing particles of a powdered oxide, such as aluminum oxide (Al$_2$O$_3$) or silica (SiO$_2$), into the reaction vessel after the thermal decomposition reaction. A suitable Al$_2$O$_3$ powder with 1-2 μm particle size and having a surface area of 300-500 m$^2$/g is commercially available from Alfa Aesar of Ward Hill, Me., or Degussa, N.J. Powdered oxide can be added to achieve a desired weight ratio between the powdered oxide and the initial amount of metal used to form the metal nanoparticles. Typically, the weight ratio can be between about 10:1 and about 15:1. For example, if 100 mg of iron acetate is used as the starting material, then about 320 to 480 mg of powdered oxide can be introduced into the solution.

The mixture of powdered oxide and the metal nanoparticle/passivating solvent mixture can be mixed to form a homogenous solution, suspension or dispersion. The homogenous solution, suspension or dispersion can be formed using sonicator, a standard laboratory stirrer, a mechanical mixer, or any other suitable method, optionally with heating. For example, the mixture of metal nanoparticles, powdered oxide, and passivating solvent can be first sonicated at roughly 80° C. for 2 hours, and then sonicated and mixed with a laboratory stirrer at 80° C. for 30 minutes to provide a homogenous solution.

After secondary dispersion, the dispersed metal nanoparticles and powdered oxide can be extracted from the passivating solvent. The extraction can be by filtration, centrifugation, removal of the solvents under reduced pressure, removal of the solvents under atmospheric pressure, and the like. For example, extraction includes heating the homogenized mixture to a temperature where the passivating solvent has a significant vapor pressure. This temperature can be maintained until the passivating solvent evaporates, leaving behind the metal nanoparticles deposited in the pores of the Al$_2$O$_3$. For example, if diethylene glycol mono-n-butyl ether as the passivating solvent, the homogenous dispersion can be heated to 231° C., the boiling point of the passivating solvent, under an N$_2$ flow. The temperature and N$_2$ flow are maintained until the passivating solvent is completely evaporated. After evaporating the passivating solvent, the powdered oxide and metal nanoparticles are left behind on the walls of the reaction vessel as a film or residue. When the powdered oxide is Al$_2$O$_3$, the film will typically be black. The metal nanoparticle and powdered oxide film can be removed from the reaction vessel and ground to create a fine powder, thereby increasing the available surface area of the mixture. The mixture can be ground with a mortar and pestle, by a commercially available mechanical grinder, or by any other methods of increasing the surface area of the mixture will be apparent to those of skill in the art.

Without being bound by any particular theory, it is believed that the powdered oxide serves two functions during the extraction process. The powdered oxides are porous and have high surface area. Therefore, the metal nanoparticles will settle in the pores of the powdered oxide during secondary dispersion. Settling in the pores of the powdered oxide physically separates the metal nanoparticles from each other, thereby preventing agglomeration of the metal nanoparticles during extraction. This effect is complemented by the amount of powdered oxide used. As noted above, the weight ratio of metal nanoparticles to powdered oxide can be between about 1:10 and 1:15. The relatively larger amount of powdered oxide in effect serves to further separate or 'dilute' the metal nanoparticles as the passivating solvent is removed. The process thus provides metal nanoparticles of defined particle size.

As will be apparent to those of skill in the art, the catalyst thus prepared can be stored for later use. In another aspect, the metal nanoparticles can be previously prepared, isolated from the passivating solvent, and purified, and then added to a powdered oxide in a suitable volume of the same or different passivating solvent. The metal nanoparticles and powdered oxide can be homogenously dispersed, extracted from the passivating solvent, and processed to increase the effective surface area as described above. Other methods for preparing the metal nanoparticle and powdered oxide mixture will be apparent to those skilled in the art.

The metal nanoparticles thus formed can be used as a growth catalyst for synthesis of carbon nanotubes, nanofibers, and other one-dimensional carbon nanostructures by a chemical vapor deposition (CVD) process.

VI. Carbon Precursors

The carbon nanotubes can be synthesized using carbon precursors, such as carbon containing gases. In general, any carbon containing gas that does not pyrolize at temperatures up to about 1000° C. can be used. Examples of suitable carbon-containing gases include carbon monoxide, aliphatic hydrocarbons, both saturated and unsaturated, such as methane, ethane, propane, butane, pentane, hexane, ethylene, acetylene and propylene; oxygenated hydrocarbons such as acetone, and methanol; aromatic hydrocarbons such as benzene, toluene, and naphthalene; and mixtures of the above, for example carbon monoxide and methane. In general, the use of acetylene promotes formation of multi-walled carbon nanotubes, while CO and methane are preferred feed gases for formation of single-walled carbon nanotubes. The carbon-containing gas may optionally be mixed with a diluent gas such as hydrogen, helium, argon, neon, krypton and xenon or a mixture thereof.

The specific reaction temperature used depends on the type of catalyst and the type of precursor. Energy balance equations for the respective chemical reactions can be used to analytically determine the optimum CVD reaction temperature to grow carbon nanotubes. This determines the required reaction temperature ranges. The optimum reaction temperature also depends on the flow rates of the selected precursor and the catalyst. In general, the method requires CVD reaction temperatures ranging from 500° C. to 1000° C., more preferably reaction temperatures ranging from 700° C. to 900° C.

Synthesis of Carbon Nanotubes

The metal nanoparticles supported on the oxide powder can be aerosolized and introduced into the reactor using the injector described above. Simultaneously, the carbon precursor gas can be introduced into the reactor. The flow of reactants within the reactor can be controlled such that the deposition of the carbon products on the walls of the reactor is reduced. The carbon nanotubes thus produced can be collected and separated.

Thus, the nanotube synthesis generally occurs as described below. The entrained powdered catalyst can be delivered near or at the top of the reaction chamber of a vertical reactor. A flow of methane or another carbon source gas, optionally with hydrogen is also delivered to the reaction chamber. The typical flow rates can be 2700 sccm for argon, 1500 sccm for methane, and 500 sccm for He. Additionally, 2500 sccm of argon can be directed into the helical flow inlets to reduce deposition of carbon products on the wall of the reaction chamber. The reaction chamber can be heated to between about 800° C. and 900° C. during reaction using heaters. The temperature can be 810° C., 820° C., 830° C., 840° C., 850° C., 860° C., 870° C., 880° C., and the like, or any temperature in between. The temperature is preferably kept below the decomposition temperature of the carbon precursor gas. For example, at temperatures above 1000° C., methane is known to break down directly into soot rather than forming carbon nanostructures with the metal growth catalyst.

Carbon nanotubes and other carbon nanostructures synthesized in reaction chamber then enter the filtration system. The filtration system can be composed of a single collection vessel or a series of collection vessels that are connected to outlet of the reaction chamber. The collection vessels sort the carbon nanotubes and other outputs by weight. On average, the heaviest reaction products will settle in the first collection vessel. The secondary and tertiary vessels will collect on average lighter products. The carbon nanotubes will be relatively light compared to many of the soot particles generated, so the carbon nanotubes will preferentially collect in the secondary and tertiary collection vessels.

The disclosed methods and apparatus permit large scale, continuous operation of the reaction chamber, as the chamber does not have to be cooled to harvest the synthesized nanotubes. Instead, the nanotubes can be harvested by changing the collection vessel. As the reaction products flow down from the reaction chamber, the collection vessels will capture the various reaction products, with lighter reaction products tending to accumulate in the secondary or tertiary collection vessel. The collection vessels can be changed to permit the harvesting of the reaction products while still synthesizing additional carbon nanostructures.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1

Preparation of the Supported Catalyst

Catalysts were prepared by impregnating support materials in metal salt solutions. For the single metallic iron based catalyst, FeAc2 in methanol was used at a molar ratio of Fe:Al2O3 of 1:15. Under a nitrogen atmosphere, FeAc2 was added to dietheylene glycol mono-n-butyl ether in the molar ratio of 1 mM:20 mM. The reaction mixture was mixed under the nitrogen atmosphere using a magnetic stir bar, and heated under reflux for 90 minutes. The reaction mixture was then cooled to room temperature, and Al2O3 (15 mM) was added at once. The reaction solution was stirred at room temperature for 15 minutes, and then heated to 150° C. for 3 hours. The reaction was cooled to 90° C. while flowing a stream of N2 over the mixture to remove the solvent. A black film formed on the walls of the reaction flask. The black film was collected and ground with an agate mortar to obtain a fine black powder.

Example 2

Synthesis of Carbon Nanotubes

About 10 g of the $Al_2O_3$-supported iron catalyst prepared in Example 1 was placed in the chamber and heated to 500° C. The heated supported catalyst was reduced by passing $H_2$/He (1:1 v/v) into the chamber. The dry, reduced supported catalyst powder thus obtained is dropped onto the conveyer belt that transports it onto the porous plate in the fluidized bed injector. The catalyst was aerosolized by passing argon through the bottom of the container and through the channels at a flow rate of 15 Lpm. The argon flow with the entrained catalyst particles is heated to about 700° C., the electrostatic charge neutralized, and delivered to the reactor. Thus, the supported catalyst, at a mass concentration of about 150 g/m$^3$ entrained in argon and preheated before being passed into the reaction chamber for producing carbon nanotubes.

The synthesis of the SWNTs was carried out in a vertical reactor. The preheated entrained catalyst is delivered near the top of the vertical reactor. The reaction chamber was preheated to 820° C. Argon, at a rate of 2500 sccm, was injected through the helical flow inlets into the reaction chamber. The synthesis was begun by flowing a mixture at $CH_4$ at a flow rate of 1500 sccm into the reaction chamber. The temperature and gas flows were maintained for 120 minutes in order to form carbon nanostructures. The single-walled carbon nanotubes were collected using the product separators. An accumulation of large quantities of dark black, silver-black and very light grey products were observed in container 1, container 2, and the trap respectively. The final product was separated from the $Al_2O_3$-support powder by treatment with hydro fluoric acid (HF). Carbon nanotubes were made with high purity of up to 95 wt %. High resolution transmission electron microscopy images (TEM) and Raman spectroscopy show that SWNTs with an average bundle diameter of approximate 7 nm.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

I claim:

1. An apparatus for injecting powder, the apparatus comprising:
    a container having side walls, an upper end, and a lower end;
    a bar at the lower end of the container, wherein the bar is attached to a piston;
    a nozzle at the upper end of the container; and
    two gas inlets situated opposite each other in the sidewalls, placed in between the nozzle and the bar and configured such that a vortex is created when gas enters through the two gas inlets, wherein the dry powder is placed over the bar and below the gas inlets.

2. The apparatus of claim 1, wherein the powder comprises a metal catalyst supported on a powdered oxide substrate wherein the powdered oxide substrate has a particle size of 0.5 µm to 5 µm.

3. A method for injecting aerosol powder, the method comprising:
    placing powder in an injector, wherein the injector comprises a container having sidewalls, an upper end, and a lower end wherein the lower end comprises a bar attached to a piston, the upper end comprises a nozzle, and the sidewalls comprising two gas inlets situated opposite each other and placed in between the nozzle and the bar, wherein the dry powder is placed over the bar and below the gas inlets;
    pushing the powder towards the upper end using the piston; and
    creating a vortex near the upper end by flowing a gas through the gas inlets wherein the powder is entailed in the vortex and the entailed powder is injected through the nozzle.

4. The method of claim 3, wherein the powder comprises a metal catalyst supported on a powdered oxide substrate.

5. The method of claim 4, wherein the powder is heated to a temperature between about 400° C. and about 900° C.

6. The method of claim 4, wherein the powder is a transition metal acetate.

7. The method of claim 3, wherein the gas is selected from the group consisting of Ar, Kr, Xe, $N_2$ and combinations thereof.

8. The method of claim 7, wherein the gas is Ar.

9. The method of claim 3, wherein the piston and the gas flow are adjusted to inject the powder at a flow rate of about 1 g/h to about 5 kg/h.

10. The method of claim 9, wherein the piston and the gas flow are adjusted to inject the powder at a flow rate of about 500 g/h to about 4.5 kg/h.

11. The method of claim 3, wherein the piston and the gas flow are adjusted to inject the powder at a flow rate of about 600 g/h to about 4 kg/h.

* * * * *